United States Patent
Tao

(10) Patent No.: US 11,956,545 B2
(45) Date of Patent: Apr. 9, 2024

(54) ELECTRONIC APPARATUS HAVING OPTICAL ZOOM CAMERA AND CAMERA OPTICAL ZOOM METHOD

(71) Applicant: ZTE Corporation, Shenzhen (CN)

(72) Inventor: Ran Tao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 155 days.

(21) Appl. No.: 17/769,442

(22) PCT Filed: Oct. 9, 2020

(86) PCT No.: PCT/CN2020/119975
§ 371 (c)(1),
(2) Date: Apr. 15, 2022

(87) PCT Pub. No.: WO2021/135487
PCT Pub. Date: Jul. 8, 2021

(65) Prior Publication Data
US 2023/0319412 A1    Oct. 5, 2023

(30) Foreign Application Priority Data
Dec. 31, 2019    (CN) .......................... 201911416995.9

(51) Int. Cl.
*H04N 23/69* (2023.01)
*H04N 23/63* (2023.01)
*H04N 23/667* (2023.01)

(52) U.S. Cl.
CPC ........... *H04N 23/69* (2023.01); *H04N 23/632* (2023.01); *H04N 23/633* (2023.01); *H04N 23/667* (2023.01)

(58) Field of Classification Search
CPC .... H04N 23/69; H04N 23/632; H04N 23/633; H04N 23/667; H04N 23/631;
(Continued)

(56) References Cited

U.S. PATENT DOCUMENTS

| 6,873,358 B1 | 3/2005 | Shimizu |
| 2002/0154912 A1 | 10/2002 | Koseki et al. |

(Continued)

FOREIGN PATENT DOCUMENTS

| CN | 101018299 A | 8/2007 |
| CN | 101326816 A | 12/2008 |

(Continued)

OTHER PUBLICATIONS

International Searching Authority. International Search Report and Written Opinion for PCT Application No. PCT/CN2020/119975 and English translation, dated Dec. 30, 2020, pp. 1-10.

(Continued)

*Primary Examiner* — Padma Haliyur
(74) *Attorney, Agent, or Firm* — Vivacqua Crane, PLLC

(57) ABSTRACT

An electronic apparatus, a camera optical-zoom method, a camera optical-zoom unit, and a memory are disclosed. The electronic apparatus may include a camera, a sensor, a processor, and a memory, where the memory stores a program instruction which, when executed by the processor, causes the processor to perform the following steps: receiving image data of a photographed object acquired by the camera; and integrating image data of a full pixel area corresponding to a zoom value of the camera according to a preset algorithm, and outputting the integrated image data according to a coordinate sequence of pixels on the sensor, where the full pixel area includes pixel areas of the sensor corresponding to the zoom value and pixel areas of the sensor corresponding to a value greater than the zoom value.

14 Claims, 7 Drawing Sheets

(58) Field of Classification Search
CPC .... H04N 25/702; H04N 23/67; G02B 13/009; G02B 15/00
See application file for complete search history.

(56) References Cited

U.S. PATENT DOCUMENTS

| | | | |
|---|---|---|---|
| 2007/0257996 A1* | 11/2007 | Kurosawa | H04N 5/2628 348/240.99 |
| 2008/0055429 A1 | 3/2008 | Yoshida | |
| 2010/0053377 A1* | 3/2010 | Yanai | H04N 23/69 348/240.2 |
| 2011/0069206 A1 | 3/2011 | LeGall et al. | |
| 2013/0250150 A1 | 9/2013 | Malone et al. | |
| 2014/0184855 A1* | 7/2014 | Yanai | H04N 23/69 348/222.1 |
| 2014/0253761 A1 | 9/2014 | Okada et al. | |
| 2017/0064174 A1* | 3/2017 | Xiao | G06T 11/60 |
| 2021/0400206 A1* | 12/2021 | Yim | H04N 23/57 |
| 2022/0321797 A1* | 10/2022 | Bian | H04N 23/69 |

FOREIGN PATENT DOCUMENTS

| | | |
|---|---|---|
| CN | 101668121 A | 3/2010 |
| CN | 104301605 A | 1/2015 |
| CN | 105100622 A | 11/2015 |
| CN | 106254767 A | 12/2016 |
| CN | 106657780 A | 5/2017 |
| CN | 109089036 A | 12/2018 |
| CN | 109286750 A | 1/2019 |
| CN | 110620861 A | 12/2019 |
| JP | 2008017090 A | 1/2008 |
| WO | WO-2021129198 A1 * | 7/2021 ........... H04N 23/631 |

OTHER PUBLICATIONS

The State Intellectual Property Office of People's Republic of China. First Office Action for CN Application No. 2019114169959 and English translation, dated Oct. 14, 2022, pp. 1-9.
The State Intellectual Property Office of People's Republic of China. First Search Report for CN Application No. 2019114169959 and English translation, dated Oct. 10, 2022, pp. 1-6.
European Patent Office. Extended European Search Report for EP Application No. 20910112.0, dated Nov. 28, 2022, pp. 1-9.
Vizgaitis, J. "Increasing dual band infrared zoom ranges", Proc. SPIE 9580, Zoom Lenses V, 95800, Sep. 9, 2015, pp. 1-10.

* cited by examiner

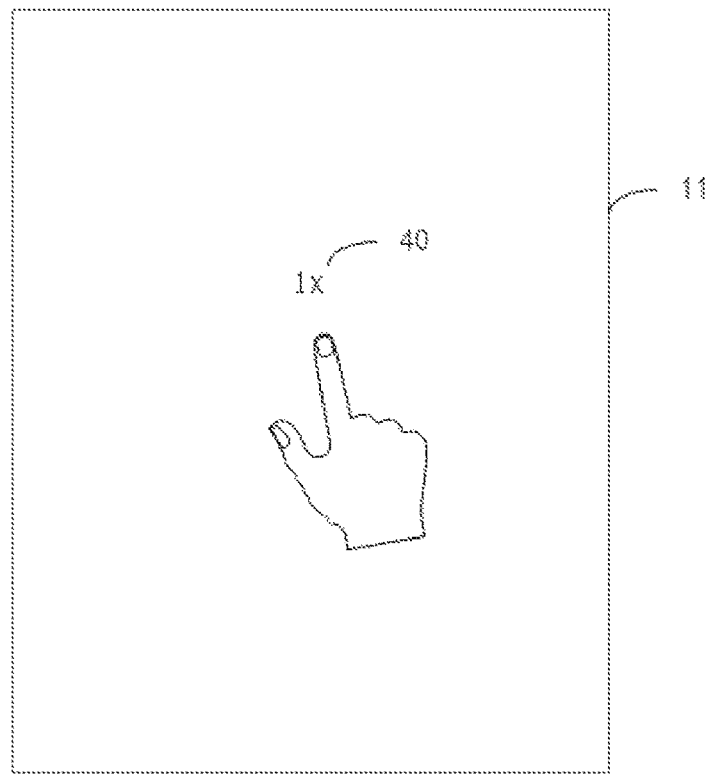
FIG. 4-a
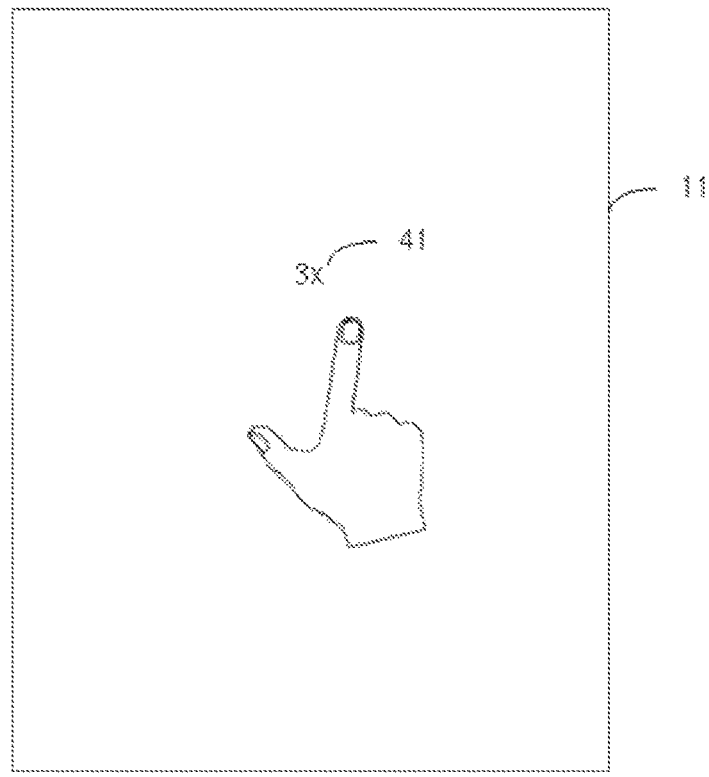
FIG. 4-b

ELECTRONIC APPARATUS HAVING OPTICAL ZOOM CAMERA AND CAMERA OPTICAL ZOOM METHOD

CROSS-REFERENCE TO RELATED APPLICATION

This application is a national stage filing under 35 U.S.C. § 371 of international application number PCT/CN2020/119975, filed Oct. 9, 2020, which claims priority to Chinese patent application No. 201911416995.9 filed Dec. 31, 2019. The contents of these applications are incorporated herein by reference in their entirety.

TECHNICAL FIELD

Embodiments of the present disclosure relate to the field of camera optical-zoom, and in particular, to an electronic apparatus for camera optical-zoom, a camera optical-zoom method, a camera optical-zoom unit, and a memory.

BACKGROUND

With the rapid development of mobile Internet, mobile terminals have become an indispensable part of people's daily life. People use mobile terminals for communication, socialization, sharing, and other activities, and one of the most frequently used functions of mobile terminals is taking photos. When taking photos of distant objects, it is necessary to use a camera optical-zoom function to take clear photos of the distant objects. In existing products and technical schemes, generally, wide-angle and telephoto modules are switched to implement optical zoom, and at least two cameras are required.

SUMMARY

In view of this, the present disclosure provides an electronic apparatus for camera optical-zoom, a camera optical-zoom method, a camera optical-zoom unit, and a memory.

According to an embodiment of the present disclosure, there is provided an electronic apparatus. The electronic apparatus may include a camera, a sensor, a processor, and a memory. The memory stores a program instruction. The processor is configured to process the program instruction to perform the following steps: receiving image data of a photographed object acquired by the camera; and integrating image data of a full pixel area corresponding to a zoom value of the camera according to a preset algorithm, and outputting the integrated image data according to a coordinate sequence of pixels on the sensor, where the full pixel area may include pixel areas of the sensor corresponding to the zoom value and pixel areas of the sensor corresponding to a value greater than the zoom value.

According to an embodiment of the present disclosure, there is further provided a camera optical-zoom method for an electronic apparatus. The camera optical-zoom method may include: receiving image data of a photographed object acquired by a camera; and integrating image data of a full pixel area corresponding to a zoom value of the camera according to a preset algorithm, and outputting the integrated image data according to a coordinate sequence of pixels on a sensor, where the full pixel area may include pixel areas of the sensor corresponding to the zoom value and pixel areas of the sensor corresponding to a value greater than the zoom value.

According to an embodiment of the present disclosure, there is further provided a camera optical-zoom unit for an electronic apparatus. The camera optical-zoom unit for an electronic apparatus may include: a receiving module, configured to receive image data of a photographed object acquired by a camera; and an integration module, configured to integrate image data of a full pixel area corresponding to a zoom value of the camera according to a preset algorithm, and output the integrated image data according to a coordinate sequence of pixels on a sensor, where the full pixel area may include pixel areas of the sensor corresponding to the zoom value and pixel areas of the sensor corresponding to a value greater than the zoom value.

According to an embodiment of the present disclosure, there is further provided a memory storing a computer program, where the computer program is configured to be run to perform the foregoing camera optical-zoom method for an electronic apparatus.

BRIEF DESCRIPTION OF DRAWINGS

The accompanying drawings are used to provide a further understanding of the technical schemes of the present disclosure, and form part of the specification. The accompanying drawings and the embodiments of the present disclosure are used together to illustrate the technical schemes of the present disclosure, and do not constitute a limitation on the technical schemes of the present disclosure.

FIG. 4-*a* is a schematic diagram of displaying a 1× zoom photographing mode option separately according to Embodiment two of the present disclosure;

FIG. 4-*b* is a schematic diagram of displaying a 3× zoom photographing mode option separately according to Embodiment two of the present disclosure;

DETAILED DESCRIPTION

To make the objectives, technical schemes and advantages of the present disclosure clearer, the present disclosure is further described below in detail with reference to the accompanying drawings and embodiments. It is to be noted that the embodiments in the present disclosure and the features in the embodiments may be arbitrarily combined with each other if not conflicted.

Figure 1:
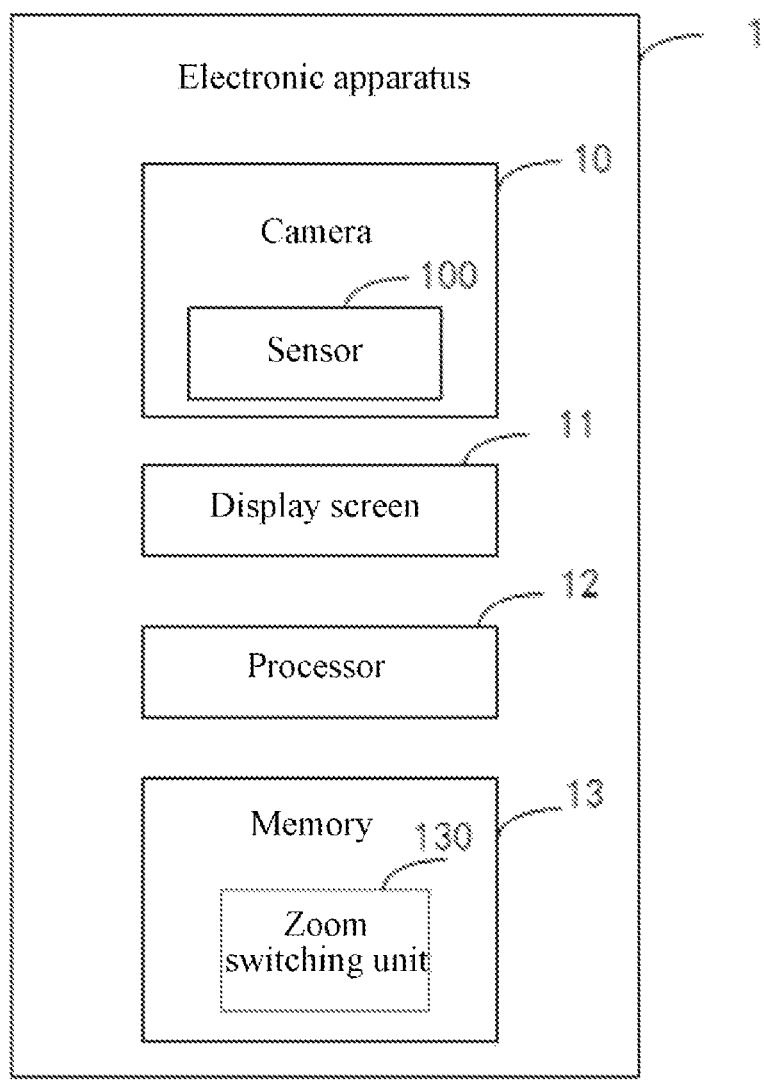
FIG. 1 is a hardware architecture diagram of an electronic apparatus according to Embodiment one of the present disclosure.

FIG. 1 is a hardware architecture diagram of an electronic apparatus 1 according to an embodiment of the present disclosure. The electronic apparatus 1 may be a mobile phone, a tablet, a computer or the like. As shown in FIG. 1, the electronic apparatus 1 includes a camera 10. There may be one or more cameras 10. In this embodiment, the present disclosure is described only by an example in which the electronic apparatus 1 includes one camera 10. The camera 10 is configured to acquire image data of a photographed object. The camera 10 includes at least one sensor. In this embodiment, the present disclosure is described only by an example in which the camera 10 includes one sensor. As shown in FIG. 1, the camera 10 includes one sensor 100. Light emitted or reflected by the photographed object is converged by a lens of the camera 10 to focus on the sensor 100. Pixel areas of the sensor 100 include an nx zoom pixel area. In this embodiment, n is a positive number greater than 0. The sensor 100 is configured to output corresponding image data of the pixel areas of the sensor 100 according to a zoom photographing mode of the camera 10. The electronic apparatus 1 further includes a display screen 11. When the electronic apparatus 1 enters a photographing preview mode, M zoom photographing mode options are displayed on the display screen 11. In this embodiment, M is an integer greater than or equal to 2. The camera enters a corresponding zoom photographing mode according to a zoom photographing mode option selected by a user on the display screen 11. The electronic apparatus 1 further includes a processor 12 and a memory 13. The memory 13 may be configured to store a computer program, for example, a software program or a module of application software. For example, in the embodiments of the present disclosure, the memory 13 stores an optical-zoom unit 130. The optical-zoom unit 130 is configured to process a computer program corresponding to a camera optical-zoom method of the electronic apparatus 1. The processor 12 runs the computer program stored in the memory 13 to perform various functional applications and data processing, that is, implement the foregoing method. The memory 13 may include a high-speed random access memory, or may include a non-volatile memory, for example, one or more magnetic storage devices, flash memories or other non-volatile solid state memories. In some examples, the memory 13 may further include memories disposed remotely with respect to the processor 12. These remote memories may be connected to the electronic apparatus 1 by a network. An example of the foregoing network includes, but is not limited to, the internet, an intranet, a local area network, a mobile communication network, and a combination thereof. The optical-zoom unit 130 receives the image data of the photographed object acquired by the camera 10, integrates image data of a full pixel area corresponding to a zoom value of the camera 10 according to a preset algorithm, and outputs the integrated image data according to a coordinate sequence of pixels on the sensor 100. The full pixel area includes pixel areas of the sensor 100 corresponding to the zoom value and pixel areas of the sensor 100 corresponding to a value greater than the zoom value. The memory 13 further stores an algorithm for mapping M zoom photographing modes of the camera to the pixel areas of the sensor 100. The algorithm is used for establishing a correspondence relationship between the M zoom photographing modes of the camera 10 and the pixel areas of the sensor 100.

Figure 2:
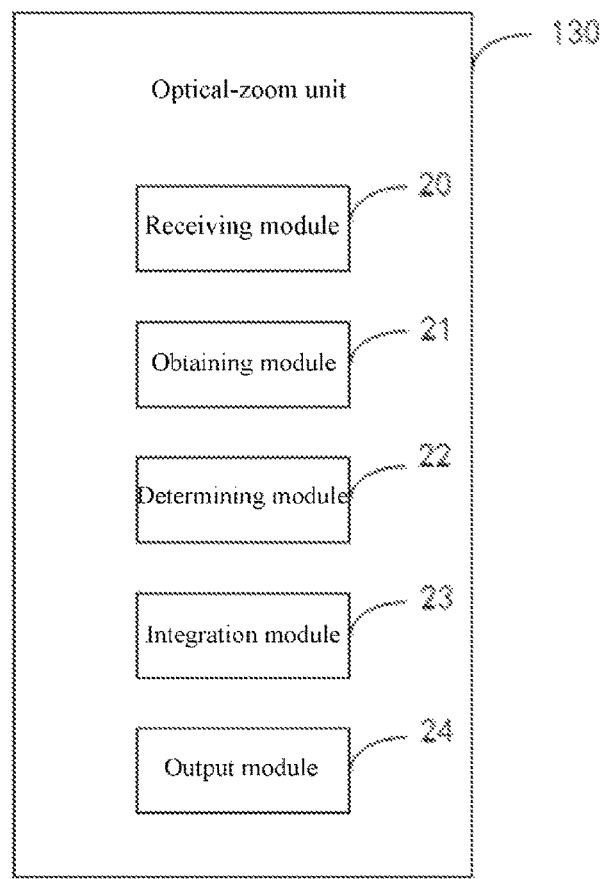
FIG. 2 is a functional module diagram of a camera optical-zoom unit according to Embodiment two of the present disclosure.

FIG. 2 is a functional module diagram of the optical-zoom unit 130 according to an embodiment of the present disclosure. The optical-zoom unit 130 includes a receiving module 20, an obtaining module 21, a determining module 22, an integration module 23, and an output module 24.

The receiving module 20 is configured to receive the image data of the photographed object acquired by the camera 10. When the camera 10 enters a photographing state, light emitted or reflected by the photographed object is converged by the lens of the camera 10 to focus on the sensor 100. The sensor 100 receives an optical signal of the light, converts the optical signal into a corresponding electrical signal, and converts the electrical signal into a digital image signal through a digital-to-analog conversion circuit. The receiving module 20 receives the digital image signal, processes the digital image signal, converts the digital image signal into image data that can be normally read by the electronic apparatus 1, and sends the image data to the memory 13 for storage.

The obtaining module 21 is configured to obtain a zoom photographing mode option selected by a user on the display screen 11, and turn on the camera 10 to enter a corresponding zoom photographing mode. In this embodiment, the camera 10 has M zoom photographing modes. M is an integer greater than or equal to 2. The electronic apparatus 1 provides M zoom photographing mode options displayed on the display screen 11 for selection by the user. In an embodiment, all the M zoom photographing mode options may be displayed on the display screen 11, or only one of the zoom photographing mode options is displayed on the display screen 11, or no zoom photographing mode option is displayed on the display screen 11.

Figure 3:
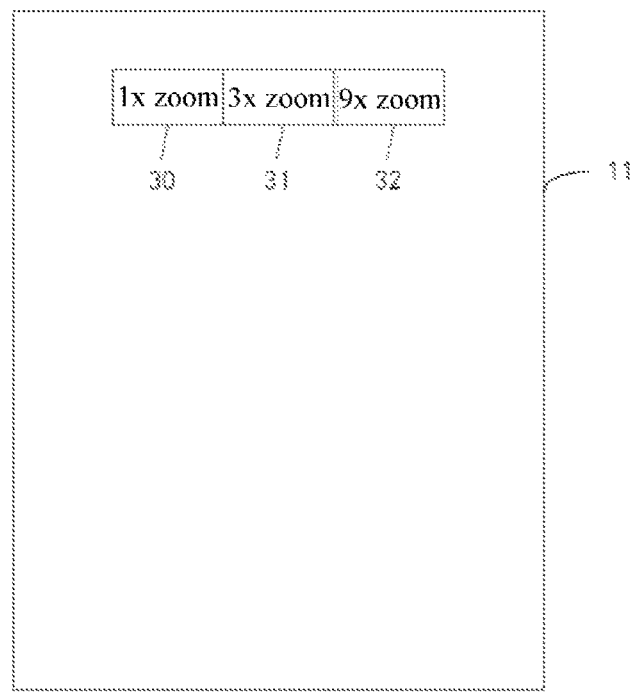
FIG. 3 is a schematic diagram of displaying three zoom photographing mode options together on a display screen according to Embodiment two of the present disclosure.

In an embodiment, as shown in FIG. 3, the camera 10 has three zoom photographing modes. The display screen 11 correspondingly displays three zoom photographing mode options, that is, a 1× zoom photographing mode (1× zoom) option 30, a 3× zoom photographing mode (3× zoom) option 31, and a 9× zoom photographing mode (9× zoom) option 32. The three zoom photographing mode options are all displayed on the display screen 11. When obtaining a 1× zoom photographing mode option selected by the user on the display screen 11, the obtaining module 21 turns on the camera 10 to enter a corresponding 1× zoom photographing mode.

In another embodiment, the display screen 11 displays only one zoom photographing mode option of the M zoom photographing mode options. As shown in FIG. 4-a, in this embodiment, the camera 10 has three zoom photographing modes. The electronic apparatus 1 provides three zoom photographing mode options, that is, a 1× zoom photographing mode (1× zoom) option, a 3× zoom photographing mode (3× zoom) option, and a 9× zoom photographing mode (9× zoom) option. When the display screen 11 enters a photographing preview mode, one zoom photographing mode option in the three zoom photographing mode options is displayed on the display screen 11. As shown in FIG. 4-a, the obtaining module 21 is configured to obtain a 1× zoom photographing mode option (1×) 40 selected by the user on the display screen 11, and turn on the camera 10 to enter a corresponding 1× zoom photographing mode. As shown in FIG. 4-b, when the user uses a finger to zoom in a photographing preview interface on the display screen 11, the photographing preview interface is switched from the 1× zoom photographing mode option (1×) 40 to a 3× zoom photographing mode option (3×) 41 or a 9× zoom photographing mode option (9×). A switching rule is determined by a ratio by which the photographing preview interface is zoomed in. When the photographing preview interface is switched from the 1× zoom photographing mode option (1×) 40 to the 3× zoom photographing mode option (3×) 41, the obtaining module 21 is configured to obtain the 3× zoom photographing mode option (3×) 41 selected by the user on the display screen 11, and turn on the camera 10 to enter a corresponding 3× zoom photographing mode. In comparison, when the user uses a finger to zoom out the photographing preview interface on the display screen 11, the photographing preview interface is switched from the 3× zoom photographing mode option (3×) 41 to the 1× zoom photographing mode option (1×) 40.

Figure 5:
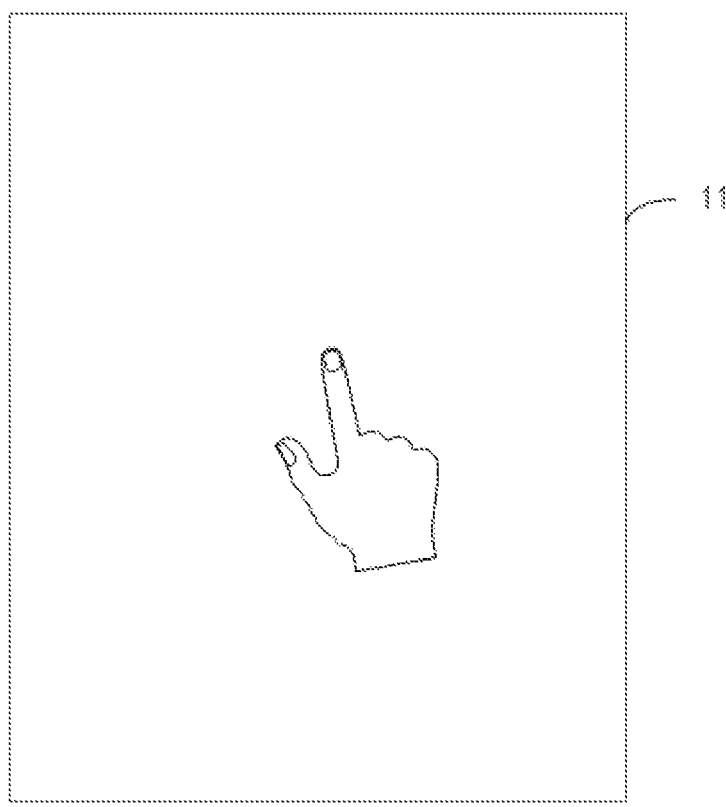
FIG. 5 is a schematic diagram of displaying no zoom photographing mode option on a display screen according to Embodiment two of the present disclosure.

In another embodiment, no zoom photographing mode option is displayed on the display screen 11. As shown in FIG. 5, in this embodiment, the camera 10 has three zoom photographing modes. The electronic apparatus 1 provides three zoom photographing mode options, that is, a 1× zoom photographing mode (1× zoom) option, a 3× zoom photographing mode (3× zoom) option, and a 9× zoom photographing mode (9× zoom) option. When the display screen 11 enters a photographing preview mode, no zoom photographing mode option in the three zoom photographing mode options is displayed on the display screen 11.

The determining module 22 is configured to determine whether a zoom value of the camera 10 is a maximum zoom value. In this embodiment, the determining module 22 is configured to determine whether the zoom value of the camera 10 is a maximum zoom value a, where a is a positive number greater than 0. When the camera 10 uses the zoom value a, the camera 10 uses an a× zoom photographing mode, and the a× zoom photographing mode is the highest-magnification zoom photographing mode in the M zoom photographing modes of the camera 10. That is, the user selects the highest-magnification zoom photographing mode option from the M zoom photographing mode options displayed on the display screen 11. As shown in FIG. 3, in this embodiment, the user selects the 9× zoom photographing mode (9× zoom) option 32 on the display screen 11.

Figure 6:
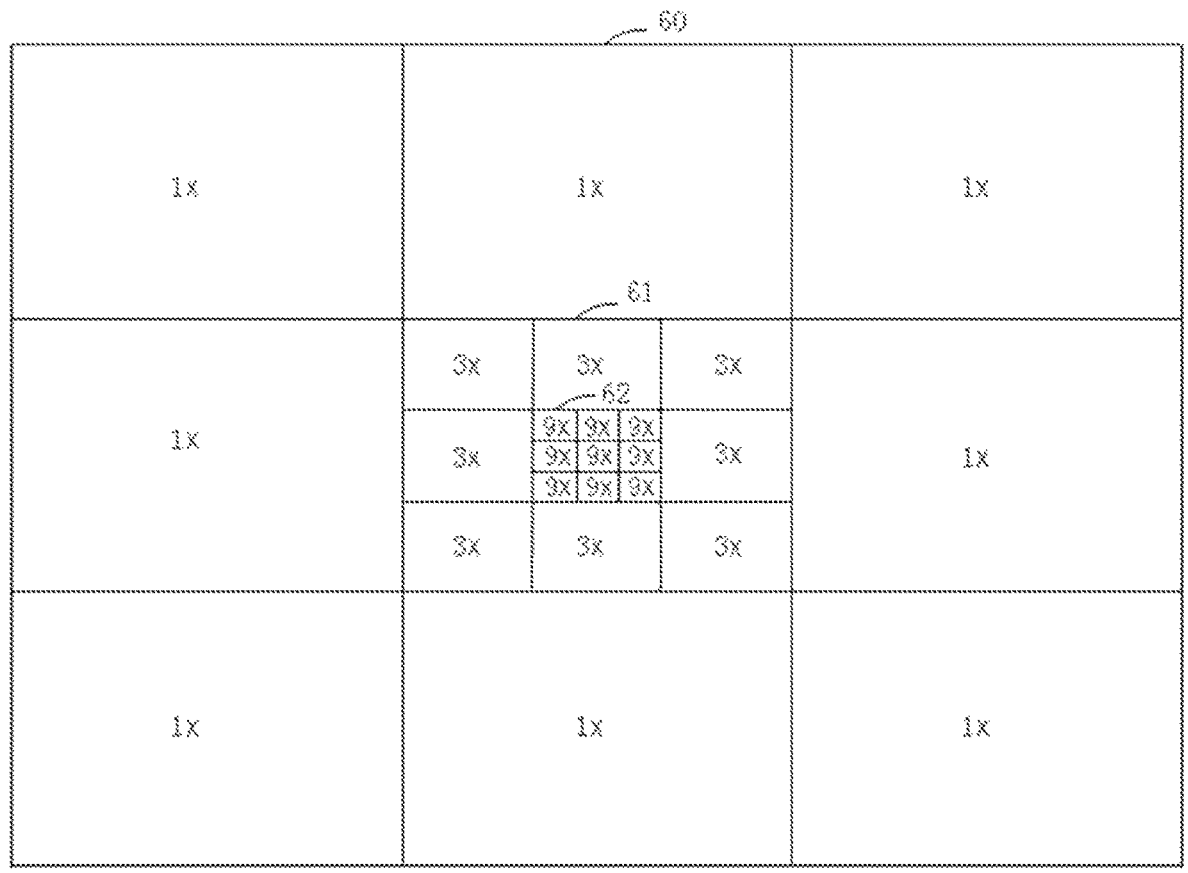
FIG. 6 is a schematic diagram of distribution of pixel areas of a sensor according to Embodiment two of the present disclosure.

When the zoom value of the camera 10 is the maximum zoom value, the output module 24 is configured to output image data of pixel areas of the sensor 100 corresponding to the zoom value according to the coordinate sequence of the pixels on the sensor 100. That is, when the camera 10 uses the zoom value a, the zoom value a corresponds to the highest-magnification zoom photographing mode in the M zoom photographing modes. The output module 24 is configured to output image data of pixel areas of the sensor 100 corresponding to the zoom value a according to the coordinate sequence of the pixels on the sensor 100. The pixel areas of the sensor 100 include an n× zoom pixel area, where n is a positive number greater than 0. As shown in FIG. 6, the sensor 100 includes a 1× zoom pixel area 60, a 3× zoom pixel area 61, and a 9× zoom pixel area 62. In the pixel areas of the sensor 100, a pixel area of the sensor 100 corresponding to the zoom value a is an a× zoom pixel area. As shown in FIG. 6, in this embodiment, a pixel area of the sensor 100 corresponding to the 9× zoom value is the 9× zoom pixel area 62. When the camera 10 uses the 9× zoom value, the output module 24 is configured to output image data of the 9× zoom pixel area 62 of the sensor 100 according to the coordinate sequence of the pixels on the sensor 100.

When the zoom value of the camera 10 is a non-maximum zoom value, the integration module 23 is configured to integrate image data of pixel areas of the sensor 100 corresponding to the zoom value and image data of pixel areas of the sensor 100 corresponding to a value greater than the zoom value according to the preset algorithm. That is, when the camera 10 uses a zoom value b, where b is a positive number greater than 0, and b is less than a, the integration module 23 is configured to integrate image data of a full pixel area corresponding to the zoom value b of the sensor 100 according to the preset algorithm. The full pixel area corresponding to the zoom value b include pixel areas of the sensor 100 corresponding to the zoom value b and pixel areas of the sensor 100 corresponding to a value greater than the zoom value b. A pixel area of the sensor 100 corresponding to the zoom value b is a b× zoom pixel area. The preset algorithm includes, but is not limited to, an interpolation algorithm and a remosaic algorithm. The integrating includes synthesizing, according to the preset algorithm, pixels in a pixel area of the sensor 100 corresponding to a value greater than the zoom value b according to a size of each pixel in the pixel area of the sensor 100 corresponding to the zoom value b, and integrating a synthesized pixel with image data of pixels in the pixel area of the sensor 100 corresponding to the zoom value b.

The output module 24 is further configured to output, according to the coordinate sequence of the pixels on the sensor 100, the image data integrated by the integration module 23.

In this embodiment, when the camera 10 uses the zoom value b, that is, when the camera 10 uses a b× zoom photographing mode, the quantity of pixels that are outputted by the output module 24 and are obtained after integration of the full pixel area corresponding to the zoom value b is x*y, where x and y are respectively the quantity of pixels in a length direction and the quantity of pixels in a width direction after the integration of the full pixel area corresponding to the zoom value b. The a× zoom pixel area may be any (b×/a)*(b y/a) pixel area in the full pixel area corresponding to the zoom value b. In this embodiment, the present disclosure is described only by an example in which the a× zoom pixel area is a central (b×/a)*(by/a) pixel area in the full pixel area corresponding to the zoom value b. That is, a central coordinate point of the a× zoom pixel area overlaps with a central coordinate point of the full pixel area corresponding to the zoom value b. A size of each pixel in the a× zoom pixel area is $b^2/a^2$ of a size of each pixel in the b× zoom pixel area. That is, the ratio of pixel quantity in the same pixel area size of the a× zoom pixel area to the b× zoom pixel area is $a^2:b^2$.

As shown in FIG. 6, when the camera 10 has a 1× zoom photographing mode, a 3× zoom photographing mode, and a 9× zoom photographing mode, the corresponding pixel area of the sensor 100 includes a 1× zoom pixel area 60, a 3× zoom pixel area 61, and a 9× zoom pixel area 62. When the camera 10 is in the 1× zoom photographing mode, the quantity of pixels that are outputted by the sensor 100 and are obtained after integration of the full pixel area corresponding to the 1× zoom value is x*y, where x and y are respectively the quantity of pixels in a length direction and the quantity of pixels in a width direction after the integration of the full pixel area corresponding to the 1× zoom value. In this embodiment, the values of x and y are both 3. That is, the quantity of pixels that are outputted by the sensor 100 and are obtained after integration of the full pixel area corresponding to the 1× zoom value is 3*3. The quantity of pixels in a length direction and the quantity of pixels in a width direction after the integration of the full pixel area corresponding to the 1× zoom value are both 3. The full pixel area corresponding to the 1× zoom value includes a 1× zoom pixel area 60, a 3× zoom pixel area 61, and a 9× zoom pixel area 62. In this embodiment, the 3× zoom pixel area 61 is a central (3/3)*(3/3) pixel area in the full pixel area corresponding to the 1× zoom value. The 9× zoom pixel area 62 is a central (3/9)*(3/9) pixel area in the full pixel area corresponding to the 1× zoom value. That is, central coordinate points of the 9× zoom pixel area 62, the 3× zoom pixel area 61, and the 1× zoom pixel area 60 overlap. A size of each pixel in the 9× zoom pixel area 62 is 1/81 of a size of each pixel in the 1× zoom pixel area 60. A size of each pixel in the 3× zoom pixel area 61 is 1/9 of a size of each pixel in the 1× zoom pixel area 60. When the camera 10 is in the 9× zoom photographing mode, the output module 24 is configured to output image data of the 9× zoom pixel area 62 according to the coordinate sequence of the pixels on the sensor 100. When the camera 10 is in the 3× zoom photographing mode, the integration module 23 is configured to integrate image data of the full pixel area corresponding to the 3× zoom value according to the preset algorithm. The full pixel area corresponding to the 3× zoom value include the 3× zoom pixel area 61 and the 9× zoom pixel area 62. The integrating includes synthesizing, according to the preset algorithm, pixels in the 9× zoom pixel area 62 according to a size of each pixel in the 3× zoom pixel area 61, and integrating a synthesized pixel with image data of pixels in the 3× zoom pixel area 61. That is, every 92/32 pixels in the 9× zoom pixel area 62 are synthesized into one pixel, and the one pixel synthesized from the 9× zoom pixel area 62 is integrated with image data of eight pixels in the 3× zoom pixel area 61. When the camera 10 is in the 1× zoom photographing mode, the integration module 23 is configured to integrate image data of the full pixel area corresponding to the 1× zoom value according to the preset algorithm. The integrating includes synthesizing, according to the preset algorithm, pixels in the 3× zoom pixel area 61 according to a size of each pixel in the 1× zoom pixel area 60, and integrating a synthesized pixel with image data of pixels in the 1× zoom pixel area 60. That is, every 32/12 pixels in the 3× zoom integrated pixel area are synthesized into one pixel, and the one pixel synthesized from the 3× zoom integrated pixel area is integrated with image data of eight pixels in the 1× zoom pixel area 60.

Figure 7:
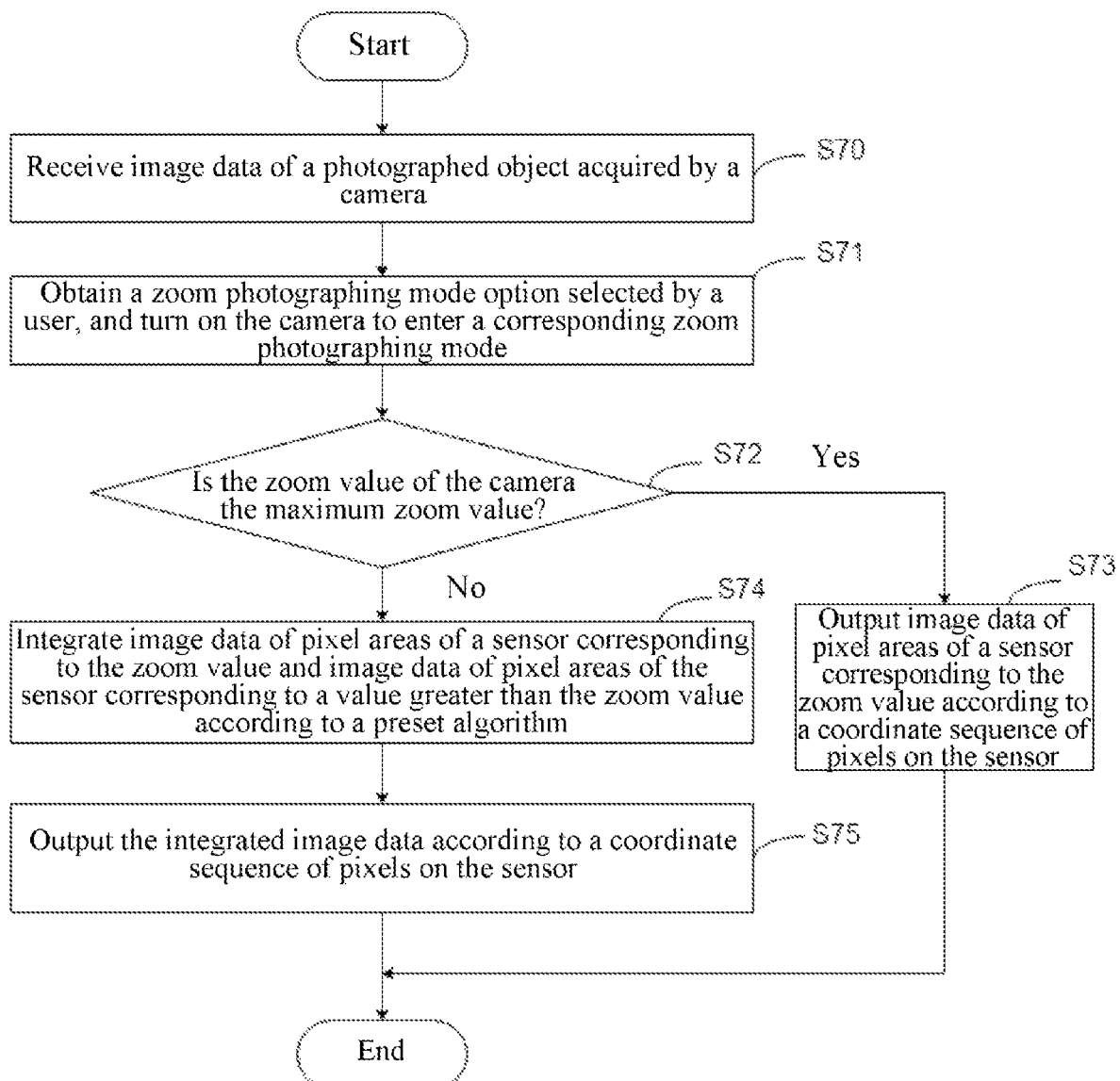
FIG. 7 is a method flowchart of a camera optical-zoom method according to Embodiment three of the present disclosure.

FIG. 7 is a method flowchart of a camera optical-zoom method for an electronic apparatus 1 according to an embodiment of the present disclosure.

At S70, the receiving module 20 receives image data of a photographed object acquired by a camera 10. When the camera 10 enters a photographing state, light emitted or reflected by the photographed object is converged by the lens of the camera 10 to focus on a sensor 100. The sensor 100 receives an optical signal of the light, converts the optical signal into a corresponding electrical signal, and converts the electrical signal into a digital image signal through a digital-to-analog conversion circuit. The receiving module 20 receives the digital image signal, processes the digital image signal, converts the digital image signal into image data that can be normally read by the electronic apparatus 1, and sends the image data to the memory 13 for storage.

At S71, the obtaining module 21 obtains a zoom photographing mode option selected by a user on a display screen 11, and turns on the camera 10 to enter a corresponding zoom photographing mode. In this embodiment, the camera 10 has M zoom photographing modes. M is an integer greater than or equal to 2. The electronic apparatus 1 provides M zoom photographing mode options displayed on the display screen 11 for selection by the user. In an embodiment, all the M zoom photographing mode options may be displayed on the display screen 11, or only one of the zoom photographing mode options is displayed on the display screen 11, or no zoom photographing mode option is displayed on the display screen 11.

In an embodiment, as shown in FIG. 3, the camera 10 has three zoom photographing modes. The display screen 11 correspondingly displays three zoom photographing mode options, that is, a 1× zoom photographing mode (1× zoom) option 30, a 3× zoom photographing mode (3× zoom) option 31, and a 9× zoom photographing mode (9× zoom) option 32. The three zoom photographing mode options are all displayed on the display screen 11. When obtaining a 1× zoom photographing mode option selected by the user on the display screen 11, the obtaining module 21 turns on the camera 10 to enter a corresponding 1× zoom photographing mode.

In another embodiment, the display screen 11 displays only one zoom photographing mode option of the M zoom photographing mode options. As shown in FIG. 4-*a*, in this embodiment, the camera 10 has three zoom photographing modes. The electronic apparatus 1 provides three zoom photographing mode options, that is, a 1× zoom photographing mode (1× zoom) option, a 3× zoom photographing mode (3× zoom) option, and a 9× zoom photographing mode (9× zoom) option. When the display screen 11 enters a photographing preview mode, one zoom photographing mode option in the three zoom photographing mode options is displayed on the display screen 11. As shown in FIG. 4-*a*, the obtaining module 21 is configured to obtain a 1× zoom photographing mode option (1×) 40 selected by the user on the display screen 11, and turn on the camera 10 to enter a corresponding 1× zoom photographing mode. As shown in FIG. 4-*b*, when the user uses a finger to zoom in a photographing preview interface on the display screen 11, the photographing preview interface is switched from the 1× zoom photographing mode option (1×) 40 to a 3× zoom photographing mode option (3×) 41 or a 9× zoom photographing mode option (9×). A switching rule is determined by a ratio by which the photographing preview interface is zoomed in. When the photographing preview interface is switched from the 1× zoom photographing mode option (1×) 40 to the 3× zoom photographing mode option (3×) 41, the obtaining module 21 is configured to obtain the 3× zoom photographing mode option (3×) 41 selected by the user on the display screen 11, and turn on the camera 10 to enter a corresponding 3× zoom photographing mode. In comparison, when the user uses a finger to zoom out the photographing preview interface on the display screen 11, the photographing preview interface is switched from the 3× zoom photographing mode option (3×) 41 to the 1× zoom photographing mode option (1×) 40.

In another embodiment, no zoom photographing mode option is displayed on the display screen 11. As shown in FIG. 5, in this embodiment, the camera 10 has three zoom photographing modes. The electronic apparatus 1 provides three zoom photographing mode options, that is, a 1× zoom photographing mode (1× zoom) option, a 3× zoom photographing mode (3× zoom) option, and a 9× zoom photographing mode (9× zoom) option. When the display screen 11 enters a photographing preview mode, no zoom photographing mode option in the three zoom photographing mode options is displayed on the display screen 11.

At S72, the determining module 22 determines whether a zoom value of the camera 10 is a maximum zoom value. In this embodiment, the determining module 22 determines whether the zoom value of the camera 10 is a maximum zoom value a, where a is a positive number greater than 0. When the camera 10 uses the zoom value a, the camera 10 uses an a× zoom photographing mode, and the a× zoom photographing mode is the highest-magnification zoom photographing mode in the M zoom photographing modes of the camera 10. That is, the user selects the highest-magnification zoom photographing mode option from the M zoom photographing mode options displayed on the display screen 11.

As shown in FIG. 3, in this embodiment, the user selects the 9× zoom photographing mode (9× zoom) option 32 on the display screen 11.

At S73, when the zoom value of the camera 10 is the maximum zoom value, the output module 24 outputs image data of pixel areas of the sensor 100 corresponding to the zoom value according to the coordinate sequence of the pixels on the sensor 100. That is, when the camera 10 uses the zoom value a, the zoom value a corresponds to the highest-magnification zoom photographing mode in the M zoom photographing modes. The output module 24 outputs image data of pixel areas of the sensor 100 corresponding to the zoom value a according to the coordinate sequence of the pixels on the sensor 100. The pixel areas of the sensor 100 include an n× zoom pixel area, where n is a positive number greater than 0. As shown in FIG. 6, the sensor 100 includes a 1× zoom pixel area 60, a 3× zoom pixel area 61, and a 9× zoom pixel area 62. In the pixel areas of the sensor 100, a pixel area of the sensor 100 corresponding to the zoom value a is an a× zoom pixel area. As shown in FIG. 6, in this embodiment, a pixel area of the sensor 100 corresponding to the 9× zoom value is the 9× zoom pixel area 62. When the camera 10 uses the 9× zoom value, the output module 24 outputs image data of the 9× zoom pixel area 62 of the sensor 100 according to the coordinate sequence of the pixels on the sensor 100.

At S74, when the zoom value of the camera 10 is a non-maximum zoom value, the integration module 23 integrates image data of pixel areas of the sensor 100 corresponding to the zoom value and image data of pixel areas of the sensor 100 corresponding to a value greater than the zoom value according to the preset algorithm. That is, when the camera 10 uses a zoom value b, where b is a positive number greater than 0, and b is less than a, the integration module 23 integrates image data of the full pixel area corresponding to the zoom value b of the sensor 100 according to the preset algorithm. The full pixel area corresponding to the zoom value b includes pixel areas of the sensor 100 corresponding to the zoom value b and pixel areas of the sensor 100 corresponding to a value greater than the zoom value b. A pixel area of the sensor 100 corresponding to the zoom value b is a b× zoom pixel area. The preset algorithm includes, but is not limited to, an interpolation algorithm and a remosaic algorithm. The integrating includes synthesizing, according to the preset algorithm, pixels in a pixel area of the sensor 100 corresponding to a value greater than the zoom value b according to a size of each pixel in the pixel area of the sensor 100 corresponding to the zoom value b, and integrating a synthesized pixel with image data of pixels in the pixel area of the sensor 100 corresponding to the zoom value b.

At S75, the output module 24 outputs, according to the coordinate sequence of the pixels on the sensor 100, the image data integrated by the integration module 23.

In this embodiment, when the camera 10 uses the zoom value b, that is, when the camera 10 uses a b× zoom photographing mode, the quantity of pixels that are outputted by the output module 24 and are obtained after integration of the full pixel area corresponding to the zoom value b is x*y, where x and y are respectively the quantity of pixels in a length direction and the quantity of pixels in a width direction after the integration of the full pixel area corresponding to the zoom value b. The a× zoom pixel area may be any (bx/a)*(by/a) pixel area in the full pixel area corresponding to the zoom value b. In this embodiment, the present disclosure is described only by an example in which the a× zoom pixel area is a central (bx/a)*(by/a) pixel area in the full pixel area corresponding to the zoom value b. That is, a central coordinate point of the a× zoom pixel area overlaps with a central coordinate point of the full pixel area corresponding to the zoom value b. A size of each pixel in the a× zoom pixel area is $b^2/a^2$ of a size of each pixel in the b× zoom pixel area. That is, the ratio of pixel quantity in the same pixel area size of the a× zoom pixel area to the b× zoom pixel area is $a^2:b^2$.

As shown in FIG. 6, when the camera 10 has a 1× zoom photographing mode, a 3× zoom photographing mode, and a 9× zoom photographing mode, the corresponding pixel area of the sensor 100 includes a 1× zoom pixel area 60, a 3× zoom pixel area 61, and a 9× zoom pixel area 62. When the camera 10 is in the 1× zoom photographing mode, the quantity of pixels that are outputted by the sensor 100 and are obtained after integration of the full pixel area corresponding to the 1× zoom value is x*y, where x and y are respectively the quantity of pixels in a length direction and the quantity of pixels in a width direction after the integration of the full pixel area corresponding to the 1× zoom value. In this embodiment, the values of x and y are both 3. That is, the quantity of pixels that are outputted by the sensor 100 and are obtained after integration of the full pixel area corresponding to the 1× zoom value is 3*3. The quantity of pixels in a length direction and the quantity of pixels in a width direction after the integration of the full pixel area corresponding to the 1× zoom value are both 3. The full pixel area corresponding to the 1× zoom value includes a 1× zoom pixel area 60, a 3× zoom pixel area 61, and a 9× zoom pixel area 62. In this embodiment, the 3× zoom pixel area 61 is a central (3/3)*(3/3) pixel area in the full pixel area corresponding to the 1× zoom value. The 9× zoom pixel area 62 is a central (3/9)*(3/9) pixel area in the full pixel area corresponding to the 1× zoom value. That is, central coordinate points of the 9× zoom pixel area 62, the 3× zoom pixel area 61, and the 1× zoom pixel area 60 overlap. A size of each pixel in the 9× zoom pixel area 62 is ⅛₁ of a size of each pixel in the 1× zoom pixel area 60. A size of each pixel in the 3× zoom pixel area 61 is ⅑ of a size of each pixel in the 1× zoom pixel area 60. When the camera 10 is in the 9× zoom photographing mode, the output module 24 outputs image data of the 9× zoom pixel area 62 according to the coordinate sequence of the pixels on the sensor 100. When the camera 10 is in the 3× zoom photographing mode, the integration module 23 integrates image data of the full pixel area corresponding to the 3× zoom value according to the preset algorithm. The full pixel area corresponding to the 3× zoom value include the 3× zoom pixel area 61 and the 9× zoom pixel area 62. The integrating includes synthesizing, according to the preset algorithm, pixels in the 9× zoom pixel area 62 according to a size of each pixel in the 3× zoom pixel area 61, and integrating a synthesized pixel with image data of pixels in the 3× zoom pixel area 61. That is, every 9²/3² pixels in the 9× zoom pixel area 62 are synthesized into one pixel, and the one pixel synthesized from the 9× zoom pixel area 62 is integrated with image data of eight pixels in the 3× zoom pixel area 61. When the camera 10 is in the 1× zoom photographing mode, the integration module 23 is configured to integrate image data of the full pixel area corresponding to the 1× zoom value according to the preset algorithm. The integrating includes synthesizing, according to the preset algorithm, pixels in the 3× zoom pixel area 61 according to a size of each pixel in the 1× zoom pixel area 60, and integrating a synthesized pixel with image data of pixels in the 1× zoom pixel area 60. That is, every 3²/1² pixels in the 3× zoom integrated pixel area are synthesized into one pixel, and the one pixel synthesized from the 3× zoom integrated pixel area is integrated with image data of eight pixels in the 1× zoom pixel area 60.

Figure 8:
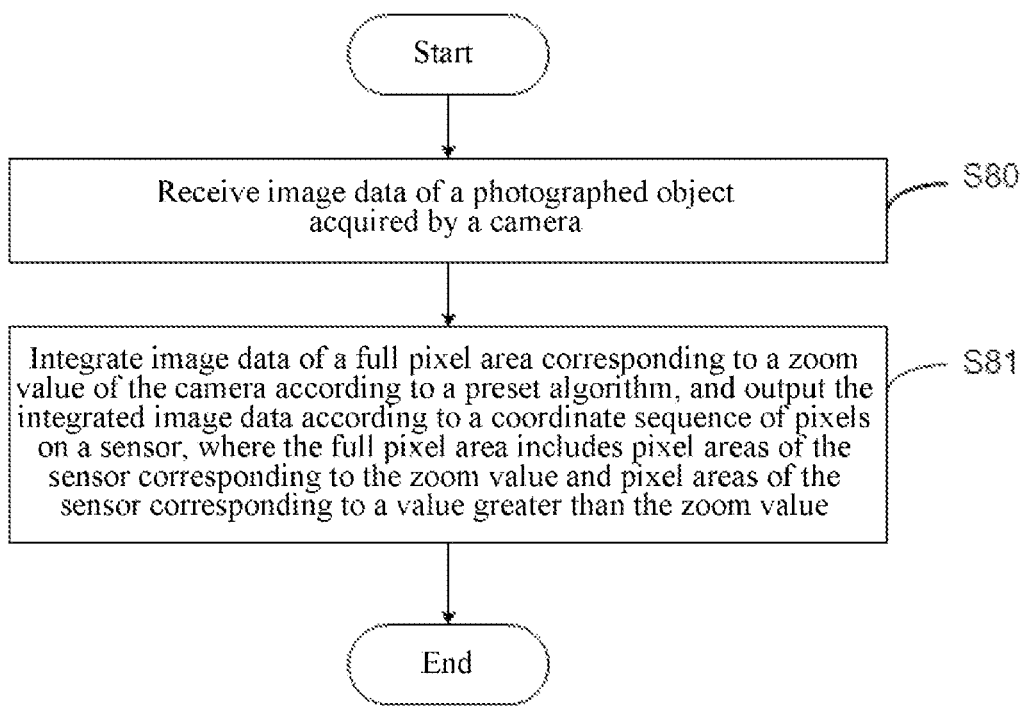
FIG. 8 is a method flowchart of a camera optical-zoom method according to Embodiment four of the present disclosure.

FIG. 8 is a method flowchart of a camera optical-zoom method for an electronic apparatus 1 according to an embodiment of the present disclosure.

At S80, image data of a photographed object acquired by a camera is received.

At S81, image data of the full pixel area corresponding to a zoom value of the camera according to a preset algorithm is integrated, and the integrated image data is outputted according to a coordinate sequence of pixels on a sensor, where the full pixel area includes pixel areas of the sensor corresponding to the zoom value and pixel areas of the sensor corresponding to a value greater than the zoom value.

In the technical schemes in the embodiments of the present disclosure, image data of a photographed object that is acquired by a camera is received, image data of the full pixel area corresponding to a zoom value of the camera is integrated according to a preset algorithm, and the integrated image data is outputted according to a coordinate sequence of pixels on the sensor, so that when an electronic apparatus is used for taking photos, an optical zoom function can be implemented by using a single camera, thereby greatly reducing the costs of cameras.

Although the embodiments disclosed in the present disclosure are as described above, the content of the present disclosure is only for the purpose of understanding the embodiments of the present disclosure and is not intended to limit the present disclosure. Those having ordinary skill in the art of the present disclosure may make any modification or change in the form and details of the implementation without departing from the technical scheme and scope of the present disclosure. However, the scope of patent protection of the present disclosure shall be subjected to the scope defined in the appended claims.

The invention claimed is:

1. An electronic apparatus, comprising a camera, a sensor, a processor, and a memory, wherein the memory stores a program instruction which, when executed by the processor, causes the processor to perform the following steps:
   receiving image data of a photographed object acquired by the camera; and
   integrating image data of a full pixel area corresponding to a zoom value of the camera according to a preset algorithm, and
   outputting the integrated image data according to a coordinate sequence of pixels on the sensor, wherein the full pixel area comprises pixel areas of the sensor corresponding to the zoom value and pixel areas of the sensor corresponding to a value greater than the zoom value;
   wherein in response to the zoom value of the camera being b and b being less than a maximum zoom value a, integrated image data of a full pixel area corresponding to the zoom value b is outputted according to the coordinate sequence of the pixels on the sensor;
   wherein the integrating comprises synthesizing, according to the preset algorithm, pixels in a pixel area of the sensor corresponding to a value greater than the zoom value b according to a size of each pixel in the pixel area of the sensor corresponding to the zoom value b, and integrating a synthesized pixel with image data of pixels in the pixel area of the sensor corresponding to the zoom value b.

2. The electronic apparatus of claim 1, wherein in response to the zoom value of the camera being the maximum zoom value a, image data of pixel areas of the sensor corresponding to the zoom value a is outputted according to the coordinate sequence of the pixels on the sensor, wherein a is a positive number greater than 0.

3. The electronic apparatus of claim 1, wherein after the receiving image data of a photographed object acquired by the camera, the processor is further configured to process the program instruction to perform the following steps:
   obtaining a zoom photographing mode option selected by a user, and
   turning on the camera to enter a corresponding zoom photographing mode.

4. The electronic apparatus of claim 1, wherein the electronic apparatus provides M zoom photographing mode options, and the M zoom photographing mode options are all displayed on a display screen, or only one of the zoom photographing mode options is displayed on the display screen, or no zoom photographing mode option is displayed on the display screen, wherein M is an integer greater than or equal to 2.

5. The electronic apparatus of claim 1, wherein a size of each pixel in the pixel area corresponding to the zoom value a is $b^2/a^2$ of a size of each pixel in the pixel area corresponding to the zoom value b.

6. A camera optical-zoom method for an electronic apparatus, comprising:
   receiving image data of a photographed object acquired by a camera; and
   integrating image data of a full pixel area corresponding to a zoom value of the camera according to a preset algorithm, and
   outputting the integrated image data according to a coordinate sequence of pixels on a sensor, wherein the full pixel area comprises pixel areas of the sensor corresponding to the zoom value and pixel areas of the sensor corresponding to a value greater than the zoom value;
   wherein in response to the zoom value of the camera being b and b being less than a maximum zoom value a, integrated image data of a full pixel area corresponding to the zoom value b is outputted according to the coordinate sequence of the pixels on the sensor;
   wherein the integrating comprises synthesizing, according to the preset algorithm, pixels in a pixel area of the sensor corresponding to a value greater than the zoom value b according to a size of each pixel in the pixel area of the sensor corresponding to the zoom value b, and integrating a synthesized pixel with image data of pixels in the pixel area of the sensor corresponding to the zoom value b.

7. The camera optical-zoom method for an electronic apparatus of claim 6, wherein in response to the zoom value of the camera being the maximum zoom value a,
   image data of pixel areas of the sensor corresponding to the zoom value a is outputted according to the coordinate sequence of the pixels on the sensor, wherein a is a positive number greater than 0.

8. The camera optical-zoom method for an electronic apparatus of claim 6, wherein after the receiving image data of a photographed object acquired by a camera, the method further comprises:
   obtaining a zoom photographing mode option selected by a user, and
   turning on the camera to enter a corresponding zoom photographing mode.

9. The camera optical-zoom method for an electronic apparatus of claim 6, wherein the electronic apparatus provides M zoom photographing mode options, and the M zoom photographing mode options are all displayed on a display screen, or only one of the zoom photographing mode options is displayed on the display screen, or no zoom photographing mode option is displayed on the display screen, wherein M is an integer greater than or equal to 2.

10. The camera optical-zoom method for an electronic apparatus of claim 6, wherein a size of each pixel in the pixel area corresponding to the zoom value a is $b^2/a^2$ of a size of each pixel in the pixel area corresponding to the zoom value b.

11. A memory, storing a computer program which, when executed by a processor, causes the processor to perform a camera optical-zoom method for an electronic apparatus, wherein the method comprises:

receiving image data of a photographed object acquired by a camera; and integrating image data of a full pixel area corresponding to a zoom value of the camera according to a preset algorithm, and outputting the integrated image data according to a coordinate sequence of pixels on a sensor, wherein the full pixel area comprises pixel areas of the sensor corresponding to the zoom value and pixel areas of the sensor corresponding to a value greater than the zoom value;

wherein in response to the zoom value of the camera being b and b being less than a maximum zoom value a, integrated image data of a full pixel area corresponding to the zoom value b is outputted according to the coordinate sequence of the pixels on the sensor;

wherein the integrating comprises synthesizing, according to the preset algorithm, pixels in a pixel area of the sensor corresponding to a value greater than the zoom value b according to a size of each pixel in the pixel area of the sensor corresponding to the zoom value b, and integrating a synthesized pixel with image data of pixels in the pixel area of the sensor corresponding to the zoom value b.

12. The memory of claim 11, wherein in response to the zoom value of the camera being the maximum zoom value a, image data of pixel areas of the sensor corresponding to the zoom value a is outputted according to the coordinate sequence of the pixels on the sensor, wherein a is a positive number greater than 0.

13. The memory of claim 11, wherein after the receiving image data of a photographed object acquired by a camera, the method further comprises:

obtaining a zoom photographing mode option selected by a user, and turning on the camera to enter a corresponding zoom photographing mode.

14. The memory of claim 11, wherein a size of each pixel in the pixel area corresponding to the zoom value a is $b^2/a^2$ of a size of each pixel in the pixel area corresponding to the zoom value b.

* * * * *